July 1, 1969  F. C. SCHAUB  3,452,604
BALANCE TESTING APPARATUS HEAD
Filed March 14, 1966  Sheet 1 of 3
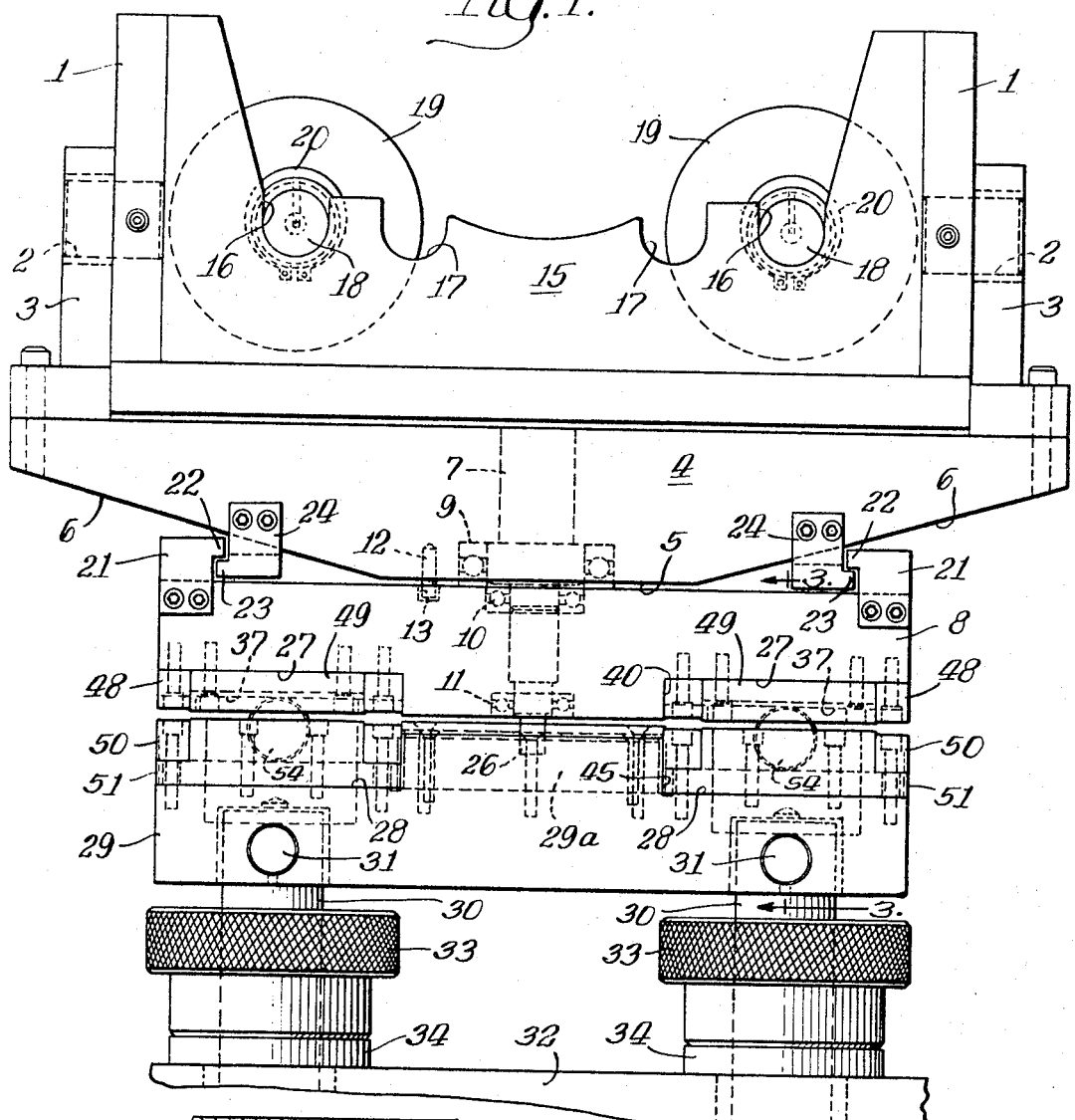
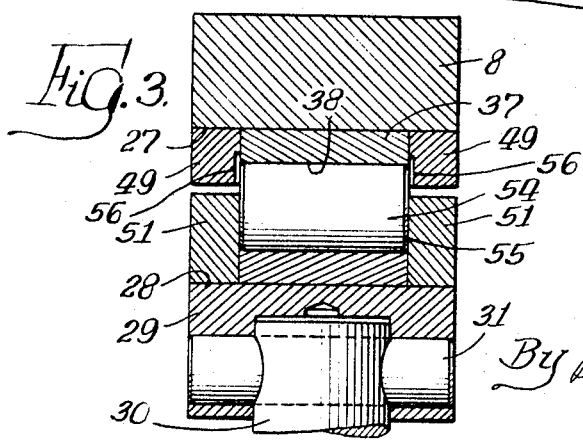
Inventor:—
Fred C. Schaub,
By Brown, Jackson, Boettcher & Dienner
Attys.

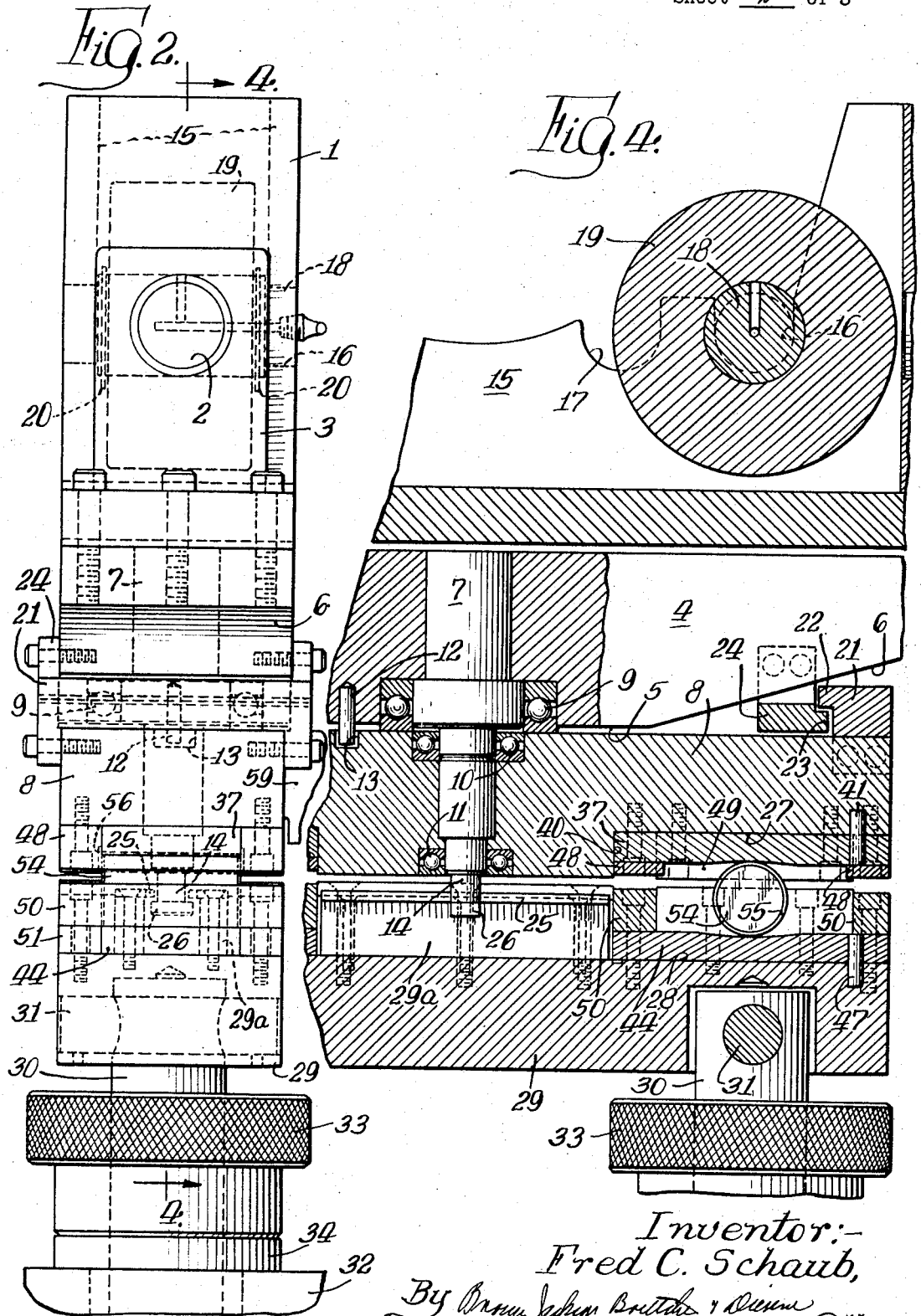

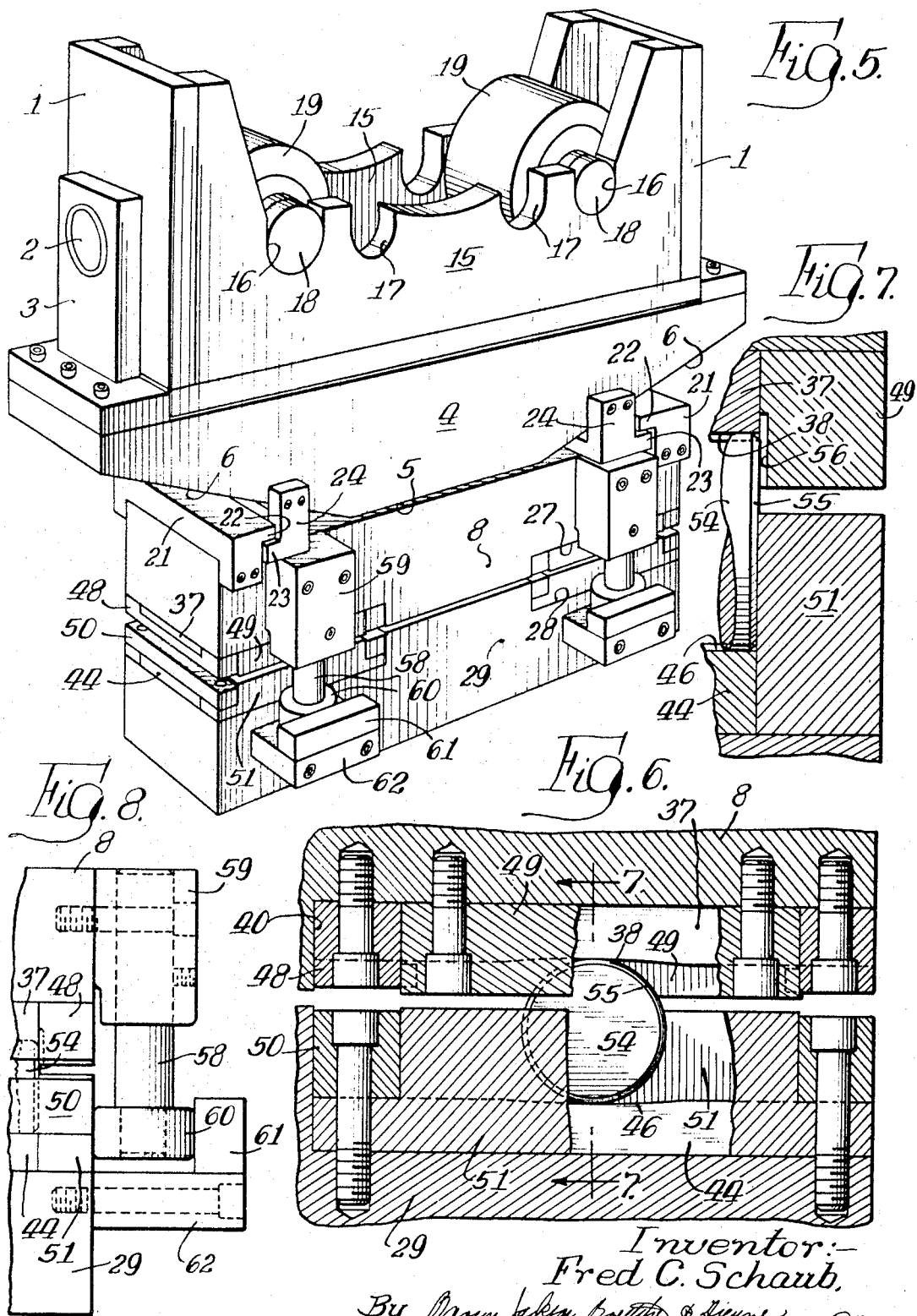

United States Patent Office 3,452,604
Patented July 1, 1969

3,452,604
BALANCE TESTING APPARATUS HEAD
Fred C. Schaub, Big Rapids, Mich., assignor to Hanchett Manufacturing Company—Raydyne Division, Big Rapids, Mich., a corporation of Michigan
Filed Mar. 14, 1966, Ser. No. 533,978
Int. Cl. G01m 1/68
U.S. Cl. 73—475                                                     5 Claims

ABSTRACT OF THE DISCLOSURE

A head for a balance testing apparatus including a cradle block, a cradle pivoted on the cradle block for movement about a horizontal axis and adapted to support a pair of spaced rotor supporting rollers, an oblong supporting block underlying the cradle block and supporting it at its midlength for turning movement about a vertical axis, an oblong base block underlying the supporting block parallel therewith, and antifriction rollers supporting the supporting block on the base block for rectilineal reciprocatory movement relative thereto and parallel therewith.

---

My invention has to do with a head for use in apparatus for balance testing large rotors of substantial weight, such as are used in steel, paper and pulp mills, railroad diesel generator armatures, electric power turbine rotors, large motor and generator armatures, etc. Many of the rotors to be tested, such as paper machine and printing press rolls, may be of substantial length and relatively small diameter. Some of them, for example, may be fifteen or thirty feet in length and but a few inches in diameter. Such long thin rollers are apt to sag when positioned on the testing head, which could lead to inaccuracies. Also many of the rotors to be tested are, as noted, of substantial weight and impose on the head a heavy load which could cause objectionable wear or injury to the bearings supporting the upper movable portion of the head for rectilineal reciprocatory movement on the lower portion thereof.

One object of my invention is to provide a testing head in which the rotor supporting means is adjustable to accommodate any sag of the rotor and thereby assure accurate positioning thereof for testing purposes. To that end, the rotor supporting means is mounted for universal movement, i.e., movement about a vertical axis and movement about a horizontal axis. A further object of my invention is to provide means whereby the upper portion of the head, comprising the load supporting assembly, has rectileal reciprocatory motion relative to a lower fixed portion and which follows the pendulum formula. It is also an object of my invention to provide roller bearing means between the movable upper portion of the head and the lower portion thereof and which assures accuracy of movements of the upper portion. To that end I provide hardened steel rollers between race ways mounted in the head portions and restrained against endwise movement by side rails or bars contacting restricted areas of the ends of the rollers whereby objectionable friction is avoided. Further objects and advantages of my invention will appear from the detail description.

In the drawings:

FIGURE 1 is a side view of a balancing machine head embodying my invention, the pedestal being shown fragmentarily and broken away;

FIGURE 2 is an end view of the head and pedestal of FIGURE 1, with the side thrust means omitted;

FIGURE 3 is a sectional view, on an enlarged scale, taken substantially on line 3—3 of FIGURE 1, certain parts being shown in elevation;

FIGURE 4 is a sectional view, on an enlarged scale, taken substantially on line 4—4 of FIGURE 2, certain parts being shown in elevation;

FIGURE 5 is a perspective side view of the head of FIGURE 1, as viewed from the side thereof opposite to that of the latter figure and with the pedestal omitted;

FIGURE 6 is a fragmentary lengthwise sectional view, on an enlarged scale, of one end portion of the head of FIGURE 5, with the cradle block omitted and certain parts broken away, the roller being shown in end view;

FIGURE 7 is a fragmentary sectional view taken substantially on line 7—7 FIGURE 6, the roller being shown fragmentarily and in elevation; and FIGURE 8 is a fragmentary end view, on an enlarged scale, of the head of FIGURE 5, with the cradle block and associated parts omitted.

The head of my invention comprises a cradle 1 of elongated U-shape pivoted at its ends on pins 2 mounted in posts 3, bolted or otherwise suitably secured to an underlying cradle block 4 of substantially elongated rectangular shape in plan and having, at its lower face, a central area 5 parallel with its upper face and connected, at each end, to the corresponding end of block 4 by an upwardly and outwardly inclined area 6. A shouldered pivot pin 7 is secured in block 4 at the midlength thereof, and extends downwardly into an underlying cradle assembly supporting block 8 at the midlength of the latter. The pin 7 has associated therewith a thrust ball bearing 9, the lower race of which seats on the upper face of block 8 and upper and lower radial bearings 10 and 11, respectively. The bearings 9, 10 and 11 are of conventional type and need not be described in detail. The cradle block 4 is thus pivoted on the block 8 for turning movement about a vertical axis. Such turning of movement of the block 4 is limited by a stud 12 secured therein and extending downwardly into an arcuate recess 13 in the upper face of block 8. The pivot pin 7 is provided at its lower end with an integral stud 14 of substantially reduced diameter. Stud 14 extends downwardly between two plates 25 bolted to a central upward extension 29a of a base block 29, to be referred to more fully presently. The extension 29a is provided with a lengthwise groove which receives two lugs 26, at the lower end of stud 14, underlying plates 25 and spaced a short distance therefrom.

The cradle 1 is provided with side walls 15, each having two pairs of generally semicircular recesses 16 and 17 extending from its upper edge. The recesses 16 are spaced a somewhat greater distance apart than are the recesses 17, the recesses of each pair being spaced an equal distance from the center of the wall 15. The recesses 16 and 17 are adapted for reception of cylindrical bearing pins or gudgeons 18 extending from the ends of rollers 19 for supporting a rotor undergoing tests. Each of the gudgeons 18 is provided with a circumferential groove which receives a snap ring 20 disposed to contact the inner face of wall 15 so as to restrain the roller 19 against axial movement. As will be understood, the rollers may be mounted in either the recesses 17 or the recesses 16, for accommodating rotors of different diameters. Lock members 21 are suitably secured, conveniently by bolting, to the ends of block 8 at each side thereof and are provided at their upper ends with inwardly projecting flanges 22 which overlie corresponding fingers 23 of lock members 24 suitably secured, conveniently by bolting, to the sides of block 4. The lock members 21 and 24 cooperate to prevent objectionable tilting of the head assembly when loading a rotor onto the rollers 19 but do not interfere with limited turning movement of the cradle assembly about the vertical axis of pivot pin 7. It will be seen that the cradle is mounted for universal movement, i.e., for turning movement about the vertical axis of pin 7 and for turning movement about the common horizontal axis of the pivot pins 2. Accordingly, the cradle may move freely to accommodate any sag or a rotor undergoing tests and may also turn about the axis of pin 7 as may be required to assure alignment of the parts, which is conducive to assuring accurate positioning and alignment of the rotor.

The block 8 is provided at its underface and each end thereof with a rectangular recess 27 overlying a similar recess 28 of somewhat greater depth in the upper face of an underlying base block 29. The blocks 8 and 29 are of oblong shape in plane and of equal width and length. An adjusting screw 30 is fixed at its upper end in block 29, adjacent each end thereof, by a cross pin 31. The screw 30 is slidably mounted in a support or pedestal 32 and receives an adjusting nut 33 seating on a collar 34 which surrounds screw 30 and seats on the upper face of pedestal 32. The screws 30 and associated parts provide leveling means of known type which need not be further described.

Each recess 27 of block 8 receives a roll race rail 37 of hardened steel and of rectangular shape in plan. The rail 37 is provided at the central area of its under face with an arcuate recess 38 having a radius of approximately thirty sixteenths of an inch lengthwise of rail 37 and extending the full width thereof. The end portions of race rail 37, beyond recess 38, are of equal and uniform thickness (FIGURES 4 and 7). The upper face of race rail 37 is flat and seats against the flat top surface of recess 27. When the race rail 37 is properly positioned in recess 27, its inner end contacts shoulder 40 at the inner end of recess 27, restraining it against inward movement. Outward movement of race rail 37 is prevented by a stud 41 secured in block 8 and extending into a corresponding bore in the outer end portion of rail 37.

A race rail 44, similar to rail 37 is mounted in each recess 28 of the base block 29. The under face of rail 44 is flat and seats upon the upper face of recess 28 with its inner end contacting shoulder 45 of recess 28. The rail 44 is provided in its upper face with an arcuate depression 46 similar and opposed to the recess of rail 37 (FIGURES 4 and 7). The rail 44 is restrained against outward movement by a stud 47 secured in block 29 and fitting snugly in an opening in rail 44, in the same manner as rail 37. As will be understood from what has been said, the blocks 8 and 29 are provided at the end portions thereof with opposed race rails seating accurately against the top and the bottom surfaces of the recesses 27 and 28, respectively, and restrained against endwise and transverse movements.

The race rails 37 and 44 are of uniform width and extend the major portion of the width of the blocks 8 and 29, respectively. The end portions of rail 37 are secured to block 8 by two substantially U-shaped end clamp bars 48 straddling rail 37 and bolted to block 8. Two side retaining bars 49, fitting between clamp bars 48, are bolted to block 8 with their upper portions contacting the sides of rail 37 effective for restraining the latter against transverse movement. The bars 49 extend downwardly beyond rail 37 and such downwardly extending portions thereof are of reduced width for a purpose to be explained later. The lower race rails 44 are secured, at their end portions, to block 29 by two flat end clamp bars 50 and are confined laterally between two side retaining bars 51. The latter are of uniform thickness and seat against the sides of rail 44 and extend a substantial distance thereabove. The end positions of bars 51 are materially reduced in height and provide seats for the terminal portions of bars 50 which, with bars 51, are bolted to block 29.

Each pair of race rails 37 and 44 receive between them a hardened steel roller 54 of substantial diameter effective for supporting the block 8 and the parts carried thereby for rectilinear reciprocatory movement relative to the base block 29. The ends of the rollers 54 are flat and perpendicular to their axes providing flat surfaces of substantial area which contact the inner faces of the bars 51 only thereby assuring that the rollers are maintained in position extending transversely of the rails 37 and 44 and perpendicular to the central vertical plane thereof. It will also be noted from FIGURES 4 and 6, that the flat ends of the respective rollers 54 are connected to the circumferential surfaces thereof by bevels 55 eliminating any sharp edges or corners which might tend to catch on the side bars 51. The reduction in width of the downwardly extending portions of the side bars 49 provides clearance 56 between bars 49 and the ends of rollers 54 thereby reducing friction, which is conducive to accuracy in operation.

The rollers 54 present substantial areas of contact with the rails 37 and 44 and are capable of supporting exceptionally heavy loads without risk of brinnelling or injury to the race rails or to the rollers, which is conducive to accuracy. In the use of the head, the extent of movement of the block 8 relative to block 29 is limited and is not such that the rollers 54 will travel beyond the arcuate depressions 38 and 46 of the rails 37 and 44, respectively. Such depressions are effective for guarding against possible escape of the rollers between the outer ends of the rails in the event of extremely excessive movement of block 8 relative to block 29, and tend to center the rollers between the rails in the normal positions of the blocks. In addition to providing load supporting areas, the continuous rounded surfaces of the rollers 54 provide a pendulum effect in the movement of block 8, conducive to accuracy in the operation of the head.

Referring to FIGURES 5 and 8, two vertical stub shafts 58 are secured at their upper portions in blocks 59 bolted to one side of block 8 adjacent the ends thereof. A roller 60 is rotatably mounted on the lower end of each shaft 58 in contact with block 29 and a restraining bar 61 suitably secured, conveniently by bolting, to a block 62 bolted to the side of the block 29. As will be understood, the rollers 60 and associated members provide side thrust means effectively preventing relative movement of block 8 transversely of block 29 and assuring that the blocks 8 and 29 are maintained in accurate lengthwise alignment.

It will be understood that variations in detail may be resorted to without departing from the field and scope of my invention, and I intend to include all such variations, as fall within the scope of the appended claims, in this application in which the preferred form only of my invention has been disclosed.

I claim:
1. In a head for balance testing apparatus, a substantially oblong supporting block, means carried by said block for rotatably supporting a member to be tested, a substantially oblong base block underlying and parallel with said supporting block, means effective for restraining said blocks against relative transverse movement, said supporting and base blocks having opposed recesses in their end portions with race rails seated therein and restrained thereby against movement relative to said blocks lengthwise thereof, bearing rollers disposed between said rails tranversely thereof mounting said supporting block for reciprocatory rectilineal movement relative to said base block, said rollers extending the major portion of the width of the respective blocks and having flat end surfaces of substantial area perpendicular to their axes, and race rail restraining bars secured to the sides of one of said blocks in abutting relation to said end surfaces of said rollers and effective in cooperation therewith for maintaining said rollers positioned transversely of said blocks.

2. A head substantially as defined in claim 1 and in which race rail restraining bars are secured to the sides of the other of said blocks and are spaced from the end surfaces of said rollers.

3. A head substantially as defined in claim 1 and in which said rails are provided in their opposed faces with tranverse arcuate recesses curved on a radius lengthwise of the respective rails and the rollers seat in said recesses.

4. In a head for balance testing apparatus, a cradle block, a cradle pivoted on said block for movement about a horizontal axis, a substantially oblong supporting block underlying said cradle block, means mounting said cradle block at its midlength on said supporting block at the midlength of the latter for turning movement about a vertical axis, a substantially oblong base block underlying said supporting block parallel therewith, and antifriction bearing means mounting said supporting block on said base block for rectilineal reciprocatory movement relative thereto and parallel therewith.

5. A head substantially as defined in claim 4 and in which said antifriction bearing means comprises rollers extending transversely of said blocks and having flat ends of substantial area, side retaining bars are secured on one of said blocks in abutting relation to the end surfaces of said rollers effective for restraining the latter against endwise movement, and means is provided effective for restraining said blocks against relative transverse movement.

References Cited
UNITED STATES PATENTS

| | | | |
|---|---|---|---|
| 2,679,439 | 5/1964 | Riopelle | 73—477 |
| 2,857,764 | 10/1958 | Frank | 73—477 |
| 2,899,827 | 8/1959 | Frank | 73—475 |

JAMES J. GILL, *Primary Examiner.*

HERBERT GOLDSTEIN, *Assistant Examiner.*